FLAGGING OF SELECTED GROUPS OF CODE SIGNALS

Filed Dec. 28, 1962 3 Sheets-Sheet 1

INVENTOR
F. F. TAYLOR
BY H. E. Kesey
ATTORNEY

FLAGGING OF SELECTED GROUPS OF CODE SIGNALS

United States Patent Office 3,273,121
Patented Sept. 13, 1966

3,273,121

FLAGGING OF SELECTED GROUPS OF CODE SIGNALS

Frank F. Taylor, Eatontown, N.J., assignor to Bell Telephone Laboratories, Incorporated, New York, N.Y., a corporation of New York Filed Dec. 28, 1962, Ser. No. 248,146
7 Claims. (Cl. 340—146.1)

Figure 1:
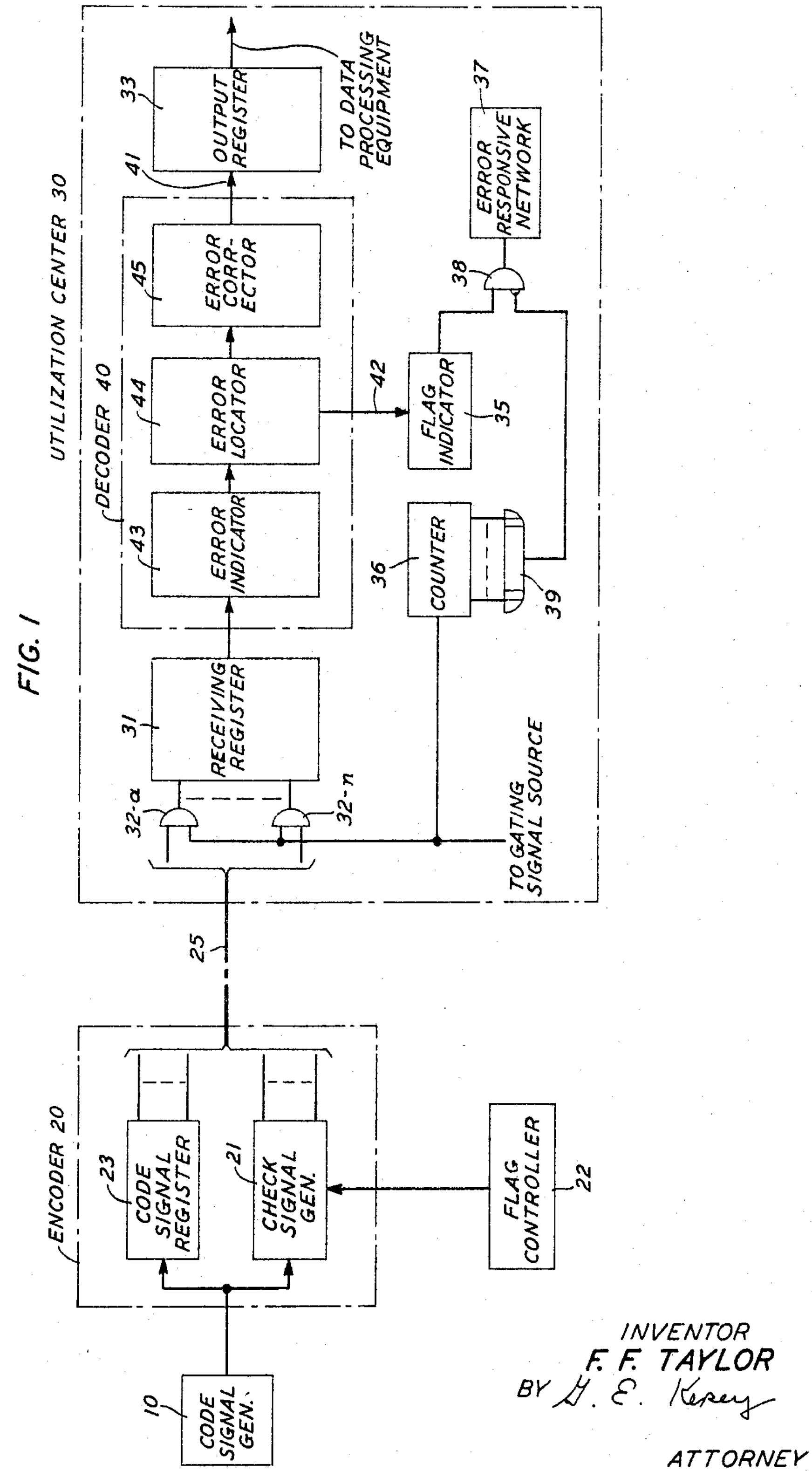

This invention relates to the detection of data processing errors, particularly by the selective identification, or "flagging," of code signals.

Code signals are employed in the processing of data to represent various items of information. When the processing is rapid, there is an increased possibility of errors, many of which can be discovered and eliminated by using errors-correcting techniques. In one of these, the originally generated code signals are supplemented by so-called check signals.

Where the originally generated code signals correspond to binary integers or "bits," so that they individually admit of one of two possible values, the supplementation takes place in the manner set forth by R. W. Hamming et al. in Patent 2,552,629, issued May 15, 1951. As demonstrated by Hamming et al., a single error in a group of binary signals can be detected and corrected if the group is constituted of a subgroup of $k$ check signals and another subgroup of not more than $n$ information signals according to the relation $n+k\leq 2^k-1$.

Thus, where there are three check bits ($k=3$) up to four information bits ($n=4$) can be accommodated since $2^3-1=7$.

On the other hand, when only two or three information bits are used, three check bits are still required since from the relation previously given, it is apparent that two check bits are able to accommodate but a single information bit. Consequently, with either two or three information bits, the required check bits will not be employed to the limit of their error-correcting capability. Nevertheless, there is little to be gained by resorting to additional information bits to take advantage of the unused checking capacity. At the same time it is wasteful to disregard the unused capacity.

Accordingly, it is an object of the invention to take advantage of any excess checking capacity that may exist in data processing systems employing error-correcting code signals.

Although satisfactory for errors in individual code signals, error-correcting techniques are not able to deal with all categories of data processing errors. Where the processing is controlled by a program constituted of instructions for acting upon data, certain steps of the program are called upon frequently and it is common practice to transfer to them as required. If an error occurs in a transfer, i.e., if the instruction to which a transfer is made is other than the instruction dictated by the program, the ensuing instructions will form incorrect sequences even though individually they may be either free from error or correctable. Hence it is desirable to verify that the various sequences are themselves correct. This can be done by selecting certain instructions of the sequences and "flagging" them, so that if a flagged instruction does not appear on schedule it is apparent that a transfer error has been made.

Accordingly it is an object of the invention to provide for the detection of errors that are beyond the capability of an error-correcting code. A related object is to accomplish the detection of transfer errors, particularly by taking advantage of the excess checking capacity that exists when checking signals of an error-correcting code are not employed to capacity.

In accomplishing the foregoing and related objects, the invention provides for turning unused error-correction capacity to account by supplementing information signals with check signals which, for a "flag" condition, override the ordinary error-correction process.

The derivation of the check signals takes place in the ordinary way except when a group of information signals is to be flagged. Then, the check signals are derived as if the information signals were accompanied by at least one additional information signal which is, in fact, not transmitted.

At a utilization center the various groups of error-correcting coded signals are decoded in a conventional way. For those that have been flagged the additional information signal used in deriving the check signals is not present since it was not transmitted. Consequently an error is indicated in the position that would be occupied by the auxiliary signal if it had been transmitted.

More specifically, when a subgroup of $n$ information bits is accompanied by $k$ check bits, giving a capability for checking more than $n+k$ bits, i.e., $n+k<2^k-1$, a group of coded signals constituted of information and check bits is flagged by deriving the check bits as if the $n$ information bits were accompanied by $f$ flag bits where $f$ accounts for at least a portion of the excess checking capacity, i.e., $n+f+k\leq 2^k-1$.

Figure 2A:
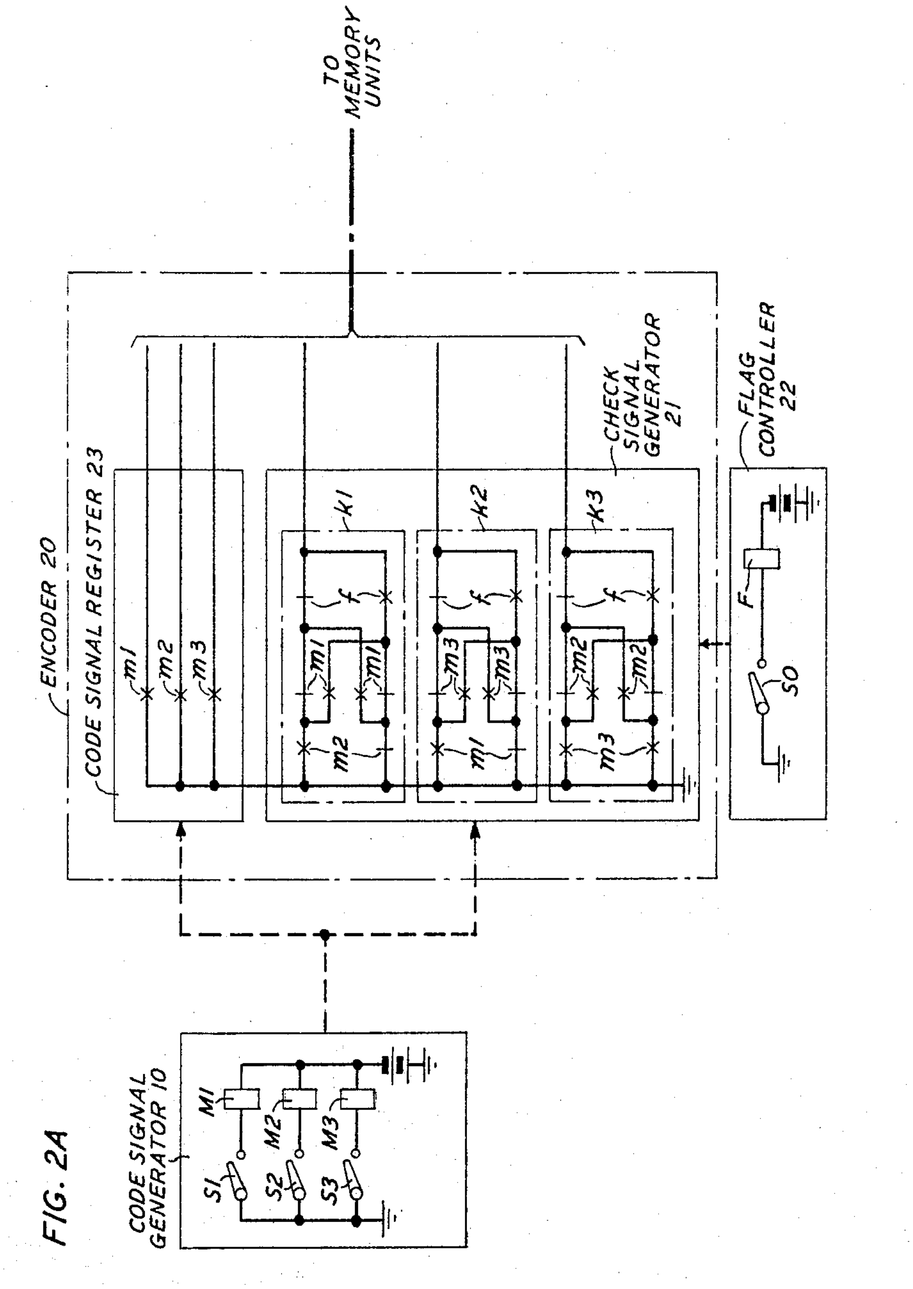
Figure 2B:
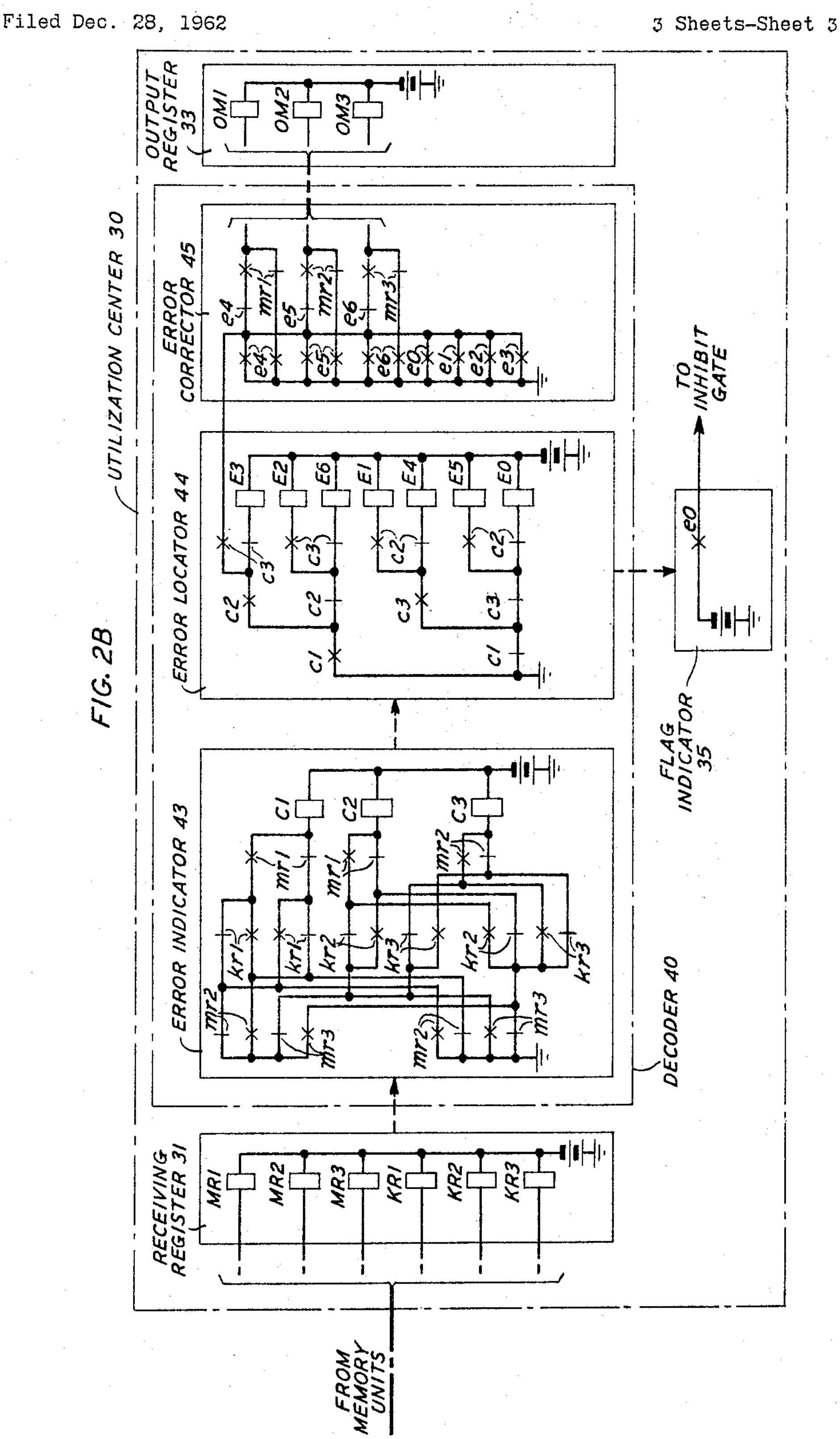

At a utilization center each group of $n+k$ bits is decoded using an ordinary error-correction decoder, as modified to account for the $f$ flag bits. When checking is undertaken, an indication of error in a nonexistent code signal serves to "flag" the coded group with which the indication is associated. Where the check bits have been derived as if the information bits were supplemented by flag signals representing "1's," an error is indicated in the code group positions that would have been occupied by the flag signals if they had been transmitted. Other aspects of the invention will become apparent after considering an illustrative embodiment taken in conjunction with the drawings in which:

FIG. 1 is a block diagram of a flagging system in accordance with the invention; and FIGS. 2A and 2B are block and schematic diagrams showing, respectively, encoder and associated component details and selected utilization center details for the system of FIG. 1.

As shown in FIG. 1, code signals derived from a code signal generator 10 and supplemented by error-correcting signals at an encoder 20 through the use of a check signal generator 21 are selectively flagged by the operation of a flag controller 22. The check signal generator 21 is largely of a kind conventionally employed in error-correcting code systems. A representative variety will be described shortly. While the check signals are being generated the code signals are temporarily stored in a register 23. Subsequently each group of the code signals, constituted of a subgroup of information signals and a subgroup of check signals is dispatched in parallel over a cable 25 encompassing a number of leads equal to the number of bits in the entire code word associated with the group. Where desirable, the group signals can be generated in series, or converted into that form.

At a utilization center 30, code signals received over the cable 25 are processed by an error-correcting decoder 40 having two outputs 41 and 42, the first of which makes available the corrected counterparts of the coded signals originally produced by the code signal generator 10 and the second of which indicates which of the coded groups have been preselected for flagging purposes.

Although the generated code signals may be applied directly to the utilization center 40 from the encoder 20, in ordinary data processing, selected groups of coded signals are flagged beforehand and stored in memory units (not shown) included in the path of cable 25. Then the utilization center 30 comes into operation as the flagged signals representing data or instructions are extracted from the memory units.

Initially the generated code signals, typically representing data and instructions, enter a receiving register 31 through a set of AND gates 32–*a* through 32–*n* operated from a gating signal source (not shown). Then the signals are applied to the decoder 40 where error is indicated, located, and corrected by corresponding units 43 through 45 of the decoder. Subsequently, the corrected coded signals enter an output register 33 from which they are applied to data processing equipment (not shown).

In one employment of flagged signals according to the invention, to allow verification that transfers among instructions have taken place according to a prescribed program, the instructions of various steps of a data processing program are flagged to allow a check from time to time that the flagged instruction arrives at the data processing equipment according to schedule. To do this, a flag indicator 35, activated by the error locator 44 of the decoder, and a counter 36, energized from the gating signal source, act upon an error responsive network 37 through an inhibit gate 38. Various outputs of the counter 36 are tapped by way of an OR gate 39 at points corresponding to the "counts" of flagged steps of the program. For example, if the second and seventh steps are to be flagged, the tap points of the counter 36 are energized at counts of two and seven.

Hence, the error network 37 responds whenever the counter 36 fails to attain a count that corresponds to the output from the flag indicator 35. The resulting indication of fault can be used to operate a warning light which notifies an operator that an error has occurred, or it can terminate further data processing until corrective action has been taken.

Details of a representative encoder and associated components are shown in FIG. 2A for the flagging system of FIG. 1. Similarly, details for selected utilization centers components are shown in FIG. 2B. Aside from suitable modifications dictated by the invention, the structure of FIGS. 2A and 2B, including reference designations, is largely that of a system originally disclosed by Hamming et al., supra.

On the assumption that a source produces groups of code signals corresponding to a code word of three information bits, three check signals are required for the purpose of detecting and correcting an error in any one of the three information bits. The information bits can take the form of pulse signals produced at the code signal generator 10 of FIG. 2A by the selective closure of three switches S, which allow the energizing of associated relays M. Thus, a group of code signals corresponding to the code word 101 is created by the closure of switches S1 and S3 for a pulse duration interval to energize associated relays M1 and M3. It is to be noted that although the embodiment of FIGS. 2A and 2B is in terms of electromechanical relays, this is purely for illustrative purposes and any device that provides switching functions can be used instead.

Once energized by information signals, the relays M operate selected transfer contacts *m* in the encoder 20 resulting in the energizing of selected relays that activate memory units not shown. For simplicity it will be assumed that the activated relays are appropriate relays MR and KR in the receiving register 31 of FIG. 2B. For example, relays M1 and M3 of FIG. 2A, operate contacts *m*1 and *m*3 resulting in the activation of receiving register relays MR1, MR3, KR1, and KR3.

When one of the generated code groups is to be flagged, a switch S0 of the flag controller 22 (FIG. 2A) is closed and associated transfer contacts *f* are operated in the check signal generator 21. Thus, if relay F of the flag controller is energized at the time of relays M1 and M3, the activated receiving register relays become MR1, MR3 and—instead of KR1 and KR3—KR2.

Once in the receiving register 31 of FIG. 2B the error-correcting groups of code signals are applied to the decoder 40. It is to be noted that the same number of code signals is applied to the decoder 40 whether or not the signals are flagged and that rather than affecting the number of signals constituting a code group, operation of the flag relay F (FIG. 2A) merely modifies the responses of the check signal relays KR1 through KR3 (FIG. 2B).

Initially, the signals of an error-correcting code group in the receiving register 31 control the contacts *mr* and *kr* of an error indicator 43 (FIG. 2B) whose check relays C1 through C3, in turn, control the contacts *c*, and thus the error relays E0 through E6 of an error locator 44. The error relays E1 through E6, in conjunction with the receiving register relays MR1 through MR3, operate the contacts $e_1$ through $e_6$ and *mr*1 through *mr*3 of the error corrector 45 by which the relays OM of the output register 33 are energized to correspond with the output of the code signal generator 10 (FIG. 2A), despite any single error in the code group at the utilization center 30.

For example, the code word 101 may be misreceived as 100, in which case the first check relay C1 of the error indicator 43 (FIG. 2B) is energized. This results in the activation of an error relay E6 in the error locator 44. The latter closes contacts $e_6$ in the error corrector so that output relay OM3 becomes energized even though the transfer *mr*3 in the error corrector 45 did not function because of the error. Since the first digit was received correctly, transfer *mr*1 in the error corrector 45 allows the first output relay OM1 also to operate through contacts $e_6$. Hence, the states of the relay OM in the output register correctly correspond to the code word 101.

However, if the generated signals have been flagged and are correctly received at the receiving register 31 (FIG. 2A), their effect upon the check relays C1 through C3 of the error indicator 43 causes relay E0 of the error locator 44 (FIG. 2B) to enable the flag indicator 35.

In addition, the received signals energize appropriate relays OM of the output register 33.

Once the flag indicator is enabled, it can provide an indication of error in a fashion similar to that described for FIG. 1.

As noted earlier, when the illustrative code word 101 is to be flagged, the relay KR2 of the receiving register 31 (FIG. 2B) is energized as a result of the operation of the flag controller 22 (FIG. 2A), instead of the relays KR1 and KR3. Consequently, if the relays MR1 and M3 of the receiving register 31 are also energized, indicative of the code word 101, none of the relays C in the error indicator will be operated and the relay E0 of the error locator 44 (FIG. 2B) is the only one operated. The latter relay E0 serves two purposes. It enables the flag indicator 35 by closing contacts *e*0; and it establishes a ground path for the output relays OM1 and OM3 by closing contacts *e*0 of the error corrector 45. Thus, the invention allows the unused error checking capacity of an error-correcting code system to be used to advantage.

Other adaptations of the invention, including its extension to other switching systems, including electronic, as well as to multiple error-correcting systems will occur to those skilled in the art.

What is claimed is:

1. Apparatus for flagging code signals, which comprises
means for generating data signals occupying *n* sequential bit positions,
means for generating a flag control signal occupying an *n*+1st bit position,
means responsive to the first and second named generating means for generating check signals which are capable of indicating an error in any one of the $n+1$ bit positions occupied by said data signals and said flag control signal, and means for decoding said data signals occupying said $n$ bit positions, and checking said data signals by said check signals, whereby an error indicated in the $n+1$st bit position of the decoded signals indicates that said data signals have been flagged by said flag control signal.

2. Apparatus comprising means for generating a set of data signals, means for generating an occasional flag signal, means responsive jointly to the data signal generating means and flag signal generating means for deriving check signals which indicate any single error in the group consisting of said data signals and said flag signal, and means for transmitting the group consisting of said data signals accompanied by said check signals and excluding said flag signal.

3. Apparatus comprising means for generating $n$ code signals, means for generating $f$ flagging signals, means for deriving $k$ error-correcting check signals from said $n$ code signals and said $f$ flagging signals where $n+f+k \leq 2^k-1$ and means for transmitting said signals as a group consisting of said $n$ code signals and said $k$ error-correcting check signals.

4. Apparatus for flagging a selected group of information code signals, which comprises means for generating a flag control signal, means responsive simultaneously to said flag control signal and the information code signals for deriving a group of error-correcting code signals, and means for transmitting said group of code signals accompanied by said error-correcting code signals.

5. Apparatus for flagging a selected group of code signals which comprises means for generating a subgroup of $n$ code signals, means for generating a subgroup of $f$ flag control signals, means responsive to said code signals and said flag control signals for deriving a subgroup of $k$ error-correcting code check signals for which $2^k-1$ is greater than or equal to $n+f+k$, and means for transmitting a group of code signals consisting of said check signals together with said code signals.

6. Apparatus comprising means for generating a group of code signals each occupying a distinctive one of $n$ discrete code positions, means for generating a flag control signal, means for deriving $k$ check signals as if, when the flag control signal is present, said group occupied $n+1$ discrete code positions, and means for transmitting the originally generated code signals together with such derived check signals.

7. Apparatus for selectively identifying an incoming group of error-correcting code signals comprising means for registering the incoming group of error-correcting code signals, means for decoding said incoming group comprising means for indicating the presence of error in the group, means for locating said error and means for correcting said error, and means responsive to said error locating means for indicating the occurrence of an error outside of said group, thereby to identify said group as one originally flagged at the time of transmission.

References Cited by the Examiner

UNITED STATES PATENTS

| | | | |
|---|---|---|---|
| Re. 23,601 | 12/1952 | Hamming | 340—146.1 |
| 3,114,130 | 12/1963 | Abramson | 340—146.1 |

ROBERT C. BAILEY, *Primary Examiner.*

M. LISS, *Assistant Examiner.*